United States Patent
Qu et al.

(10) Patent No.: US 6,965,786 B2
(45) Date of Patent: Nov. 15, 2005

(54) ANNUNCIATORS FOR VOICE AND DATA APPLICATIONS IN WIRELESS COMMUNICATION DEVICES

(75) Inventors: Hai Qu, San Diego, CA (US); Guangming Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 231 days.

(21) Appl. No.: 10/218,323

(22) Filed: Aug. 13, 2002

(65) Prior Publication Data

US 2004/0203651 A1 Oct. 14, 2004

(51) Int. Cl.$^7$ ................................................. H04B 1/38
(52) U.S. Cl. ........................ 455/566; 455/415; 455/563; 455/412.2; 379/88.01
(58) Field of Search ................................. 455/566, 415, 455/563, 412.2, 421, 413, 567, 412.1; 379/88.01

(56) References Cited

U.S. PATENT DOCUMENTS

| | | | | |
|---|---|---|---|---|
| 5,737,394 A | * | 4/1998 | Anderson et al. | 379/88.11 |
| 5,930,701 A | * | 7/1999 | Skog | 455/415 |
| 6,029,063 A | * | 2/2000 | Parvulescu et al. | 455/412.1 |
| 6,157,844 A | * | 12/2000 | Doran et al. | 455/552.1 |
| 6,333,973 B1 | * | 12/2001 | Smith et al. | 379/88.12 |
| 6,393,307 B1 | * | 5/2002 | Kim | 455/566 |
| 6,415,164 B1 | | 7/2002 | Blanchard et al. | 455/566 |
| 6,456,841 B1 | * | 9/2002 | Tomimori | 455/412.2 |
| 6,473,629 B1 | * | 10/2002 | Chang | 455/566 |
| 6,510,208 B1 | * | 1/2003 | Komiya | 379/88.1 |
| 6,720,863 B2 | * | 4/2004 | Hull et al. | 340/7.51 |

FOREIGN PATENT DOCUMENTS

| | | | | |
|---|---|---|---|---|
| EP | 1069791 A1 | | 7/1999 | H04Q/7/22 |
| EP | 1 069 791 A1 | * | 3/2001 | H04Q/7/22 |
| EP | 1154619 A1 | | 11/2001 | H04M/1/247 |
| EP | 1209882 A2 | | 5/2002 | H04M/1/247 |

* cited by examiner

*Primary Examiner*—Fan Tsang
*Assistant Examiner*—Simon Sing
(74) *Attorney, Agent, or Firm*—Philip Wadsworth; Charles D. Brown; Kyong H. Macek (57) ABSTRACT

Techniques to provide the current status of voice and data applications in wireless devices. Annunciators are provided for these applications and are displayed as appropriate to indicate their current status. Certain applications may further be associated with additional menu screens to allow the user to view additional information. In one method, the current status of a particular application supported by the wireless device is initially determined. This application may be voice call handling, data call handling, voice recognition, voice memo, answering machine, or some other application. An annunciator indicative of the current status of the application is then provided, if required. A menu screen with a listing of all items (e.g., missed calls, recorded voice memos, recorded messages, or data calls) may be displayed when requested, and additional information for a selected item may also be provided if requested. The annunciator is cleared if all items are cleared.

23 Claims, 5 Drawing Sheets

ANNUNCIATORS FOR VOICE AND DATA APPLICATIONS IN WIRELESS COMMUNICATION DEVICES

BACKGROUND

1. Field

The present invention relates generally to wireless communication, and more specifically to techniques for displaying annunciators and associated menu screens for voice and data applications in wireless communication devices.

2. Background

Wireless communication systems are widely deployed to provide various types of communication such as voice, packet data, video, messaging, and so on. These systems may be multiple-access systems capable of supporting communication with multiple users and may be based on code division multiple access (CDMA), time division multiple access (TDMA), frequency division multiple access (FDMA), or some other multiple access techniques.

Wireless communication devices (e.g., cellular phones) are widely used for communication with wireless communication networks and for other functions and applications. For example, these devices may be used to originate and receive voice and data calls, retrieve messages from voice-mail boxes maintained by the networks, store information such as phone books, and so on. Besides functioning as a replacement for conventional telephones, these wireless devices offer the advantage of portability and allow the users to establish wireless communication from virtually any location within the coverage of the networks.

Wireless devices may be designed to support various voice applications in addition to the basic functions and applications described above. For example, voice recognition may be used to allow for hands-free operation of a wireless device, which is highly desirable for safety reasons in an automobile. The voice recognition feature is normally supported by operating the wireless device in conjunction with a hands-free kit that can recognize voice commands from the user. The voice recognition capability typically needs to be activated before it can be used. As another example, a "voice memo" application allows the user to record messages on the wireless device.

It is desirable to be able to easily view the current status of the various voice applications supported by a given wireless device. This is especially true in a mobile environment where the user's attention should be focused on other things instead of looking for the status of a particular voice application.

There is therefore a need in the art for techniques to efficiently and clearly display the current status of various applications supported by wireless devices.

SUMMARY

Techniques are described herein to provide the current status of voice and data applications, such as voice call handling, voice recognition, voice memo, answering machine, data, and so on, in wireless devices. In an aspect, annunciators are provided for voice and data applications and are displayed as appropriate to indicate the current status of these applications. An annunciator is an icon or a symbol that is displayed, when enabled, typically at a designated location on the display. Certain applications may further be associated with additional menu screens to allow the user to view additional information and to facilitate the processing of items for these applications.

In an embodiment, a method is provided for displaying annunciators for voice applications in a wireless communication device. In accordance with the method, the current status of a particular application supported by the wireless device is initially determined. This application may be voice call handling, data call handling, voice recognition, voice memo, answering machine, or some other application. An annunciator indicative of the current status of the application is then provided, if required.

The application may be voice call handling, in which case the annunciator is provided if at least one voice call has been missed. A menu screen with a listing of missed calls may be displayed when requested, and additional information for a selected missed call may also be provided if requested.

The application may be voice recognition, in which case the annunciator may indicate the current state of voice recognition on the wireless device (e.g., not available, enabled, or activated). The voice application may be voice memo, in which case the annunciator is provided if at least one new voice memo has been recorded on the wireless device. The voice application may be answering machine, in which case the annunciator may indicate whether the answering machine is deactivated or activated and whether or not there are any new messages recorded by the answering machine. A menu screen with a listing of recorded voice memos or messages may be displayed when requested, and additional information for a selected voice memo or message may also be provided if requested. The annunciator may be cleared if all items (e.g., all missed calls, recorded voice memos, or recorded messages) for the associated application has been cleared (e.g., by playing the voice memo or message).

Various aspects and embodiments of the invention are described in further detail below. The invention further provides methods, program codes, integrated circuits, wireless communication devices, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
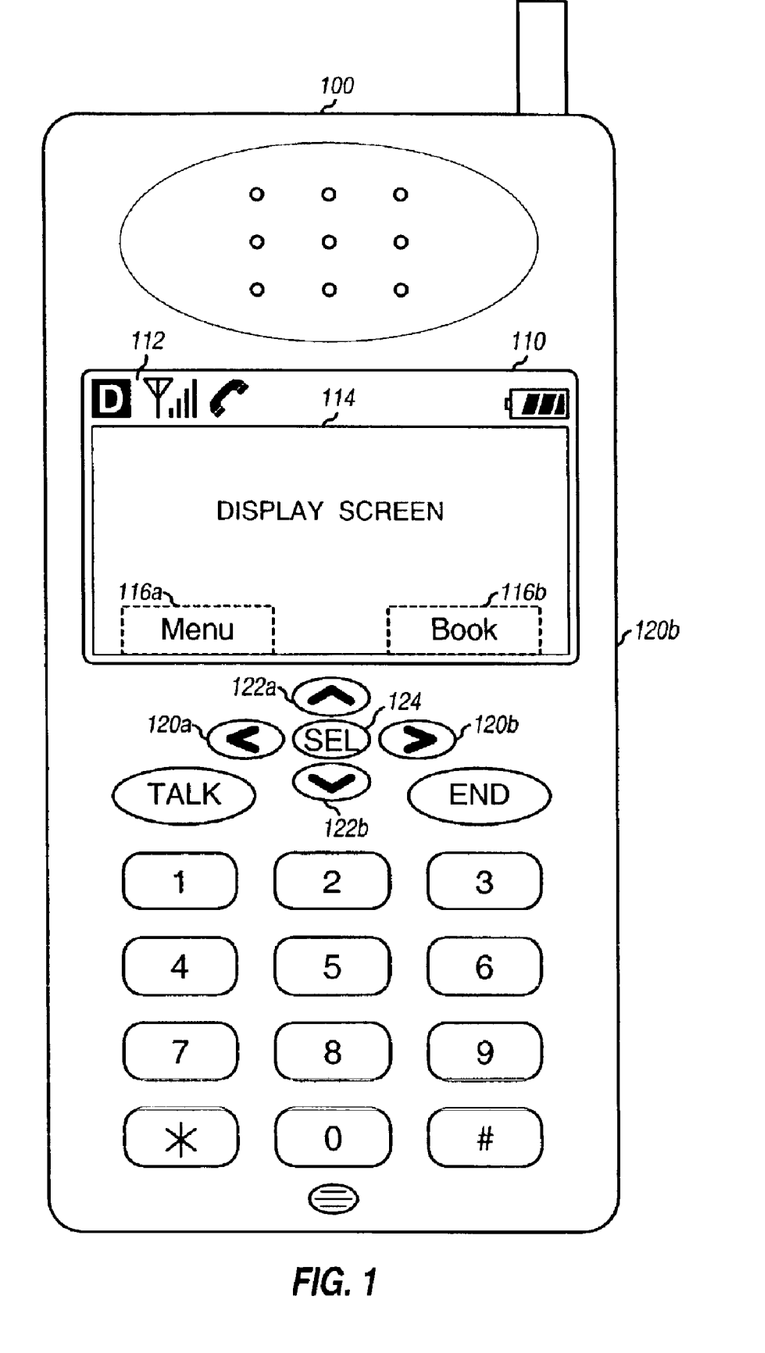
FIGS. 1 and 2 show an example wireless communication device with various annunciators being displayed for voice and data applications.

FIG. 1 shows an example wireless communication device 100 that can display the annunciators and associated menu screens for voice and data applications. Wireless device 100 may be a cellular phone, a wireless terminal, a remote station, a personal digital assistant (PDA), or some other type of device. Wireless device 100 includes a number of functional elements such as a speaker, a microphone, a display 110, a keypad, and so on.

Display 110 shows annunciators 112 on the top row of the display. These annunciators are used to indicate the current status of the device and are displayed as appropriate. The annunciators are described in further detail below. Display 110 further includes a display screen 114 that is used to show information for calls and soft-key menu options 116 (if any). Each such soft-key menu option may be selected by pressing an associated physical key. For example, soft-key menu options 116a and 116b may be selected by pressing "Scroll Left" and "Scroll Right" keys 120a and 120b, respectively. The soft-key menu options can change depending on the state of the display and the type of information being shown, as described below. Moreover, the number of soft-key menu options that may be displayed on the screen at any given moment may be limited by (1) the size of the display screen and (2) the availability of physical keys that may be used for the soft-key menu options.

It is highly desirable to make the size of wireless devices as small as possible to enhance their portability. However, there is inherent limitation on the size reduction that can be achieved for some of the functional elements. For example, the keys need to be of certain minimum size so that they can be pressed easily by the user. Because of the small device size and the inability to further reduce the size of certain functional elements, the displays on these wireless devices are typically small.

Even with the size limitation on the displays, it is desirable to provide the current status of functions and applications supported by the wireless devices in an efficient and clear manner. This is especially true in a mobile environment where the user should be able to quickly ascertain the current status of any particular function or application without having to divert focus from other things.

Normally, the current status of certain functions and applications for wireless devices is indicated by annunciators. An annunciator is an icon or a symbol that is continuously displayed, when enabled, typically at a designated location on the display (e.g., in the top row of the display, as shown in FIG. 1, the bottom row of the display, or some other location). Table 1 lists the annunciators that are currently used for wireless devices.

TABLE 1

| Icon | Name | Description |
| --- | --- | --- |
| D | Mode Indicator | Indicate that the wireless device is under the coverage of a digital communication network. |
| R | Roaming | Indicate that the wireless device is outside of the home service area. |
| Y.ıll | Signal Strength | Indicate the strength of the signal received from the network at the wireless device. |
| ☏ | In Use | Indicate that at least one call is currently in progress. |
| ☏ | No Service | Indicate that the wireless device is not receiving a signal from the network. |
| ✉ | Voicemail | Indicate that there is at least one new voicemail message recorded at the network for the wireless device. |
| ▮▮▮ | Battery Level | Indicate the remaining battery charge on the wireless device. |

Currently, there are no annunciators for certain voice and data applications. One example of such a voice application is voice call handling. Conventionally, if a call is missed because the wireless device is either turned off or the user failed to answer the call (e.g., by pressing the "TALK" button), a notification message such as "Missed Call" may be sent by the network or generated by the wireless device and shown on the display screen of the device. However, the user may not be aware of this message being displayed. Oftentimes, this message would disappear due to some event, such as the user pressing any key, an incoming call, an incoming message, and so on.

This method of notifying the user of missed call is inadequate for several reasons. First, the message is displayed the first time a call is missed and may not indicate how many calls have been missed. Second, the message is cleared or deleted for all missed calls by any of the events described above. The undesirable effect is that one inadvertent key press can clear the notification message for all calls that have been missed, and the user may not be properly informed of the missed calls.

Wireless devices may be designed to support other voice applications such as voice recognition, voice memo, answering machine, and so on, as well as data applications. At any given moment, the user may need to ascertain the current status of a given application. Depending on the particular application, the pertinent status information may be whether or not that application is activated for use, whether or not there are any new items for the application, and so on.

Techniques are described herein to provide the current status of voice and data applications in wireless devices. These applications include voice call handling, voice recognition, voice memo, answering machine, data, and so on. In an aspect, annunciators are provided for voice and data applications and are displayed as appropriate to indicate the current status of these applications. Certain applications may further be associated with additional menu screens to allow the user to view additional information and to facilitate the processing of the items for these applications.

Table 2 lists annunciators that may be used for voice and data applications in wireless devices. These annunciators and their associated applications are described in further detail below.

TABLE 2

| Icon | Name | Description |
| --- | --- | --- |
| ☒ | Missed Call | Indicate that there has been at least one missed call for the wireless device. |
| VR | Voice Recognition | Indicate that voice recognition is activated and ready to be used. |
| 🗎 | Voice Memo | Indicate that there is at least one voice memo recorded by the wireless device. |
| AM | Answer Machine | Indicate that there is at least one message recorded by the wireless device. |
| 0101 1011 | Data Call | Indicate that there is at least one data call in progress. |

Voice Call Handling—Missed Calls

In an embodiment, a Missed Call annunciator is shown on the display when one or multiple calls have been missed. This annunciator may be displayed starting from the time the first missed call was received until the time the annunciator is cleared. The Missed Call annunciator may be cleared by various user actions such as, for example (1) the user pressing a specific key or menu option defined to clear the annunciator, or (2) the user having viewed a listing of missed calls and clearing the annunciator.

Figure 3A:
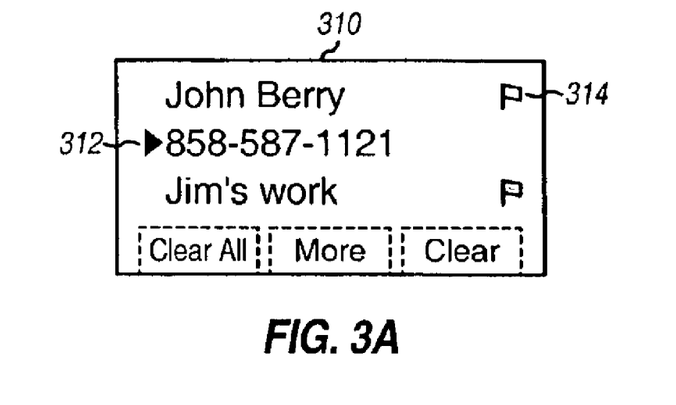
FIGS. 3A through 3C illustrate example menu screens for a list of missed calls, a list of recorded voice memos, and a list of messages recorded by the answering machine, respectively.

FIG. 3A illustrates an example menu screen 310 for a list of missed calls. This menu screen may be shown in response to the user pressing a particular key or menu option defined to invoke this screen. In an embodiment, the missed call menu screen shows all of the calls that have been missed, e.g., one call per line. Each line would contain some pertinent information identifying the missed call (e.g., the caller name or phone number). The user may be able to scroll through the list of missed calls by pressing the "Scroll Up" key 122a and "Scroll Down" key 122b on the keypad and select a particular missed call with the "SEL" key 124. The missed call currently selected may be indicated by an arrow 312, reverse highlighting (e.g., white text on a black background), or by some other means.

In an embodiment, additional information for the selected missed call may be obtained, for example, by pressing the "SEL" key or a "More" soft-key menu option. Another screen may then be displayed for the additional information, which may include the phone number, the date and time the call was received, and so on. The selected missed call may also be cleared by selecting a "Clear" soft-key menu option (with the "Scroll Right" key). A flag 314 may be used to indicate whether or not the missed called has been cleared without having to actually remove the cleared call from the menu screen. All missed calls may also be cleared by selecting a "Clear All" soft-key menu option (with the "Scroll Left" key). Upon clearing all missed calls, the Missed Call annunciator is cleared or removed from the display.

The Missed Call annunciator and associated menu screens can provide better notification of missed calls than the conventional method described above. The Missed Call annunciator is continually displayed so that the user can see it at any time, and remains displayed until it is cleared by the user (and not by some inadvertent action). Moreover, through the associated menu screens, the user can easily ascertain the number of missed calls and obtain additional information that may be available for these calls.

Voice Recognition

Voice recognition is normally supported by operating the wireless device in conjunction with a hands-free kit that can recognize voice commands from the user. The voice recognition system (i.e., the combination of the wireless device and hands-free kit) typically needs to be trained with a wake-up word by the user. This wake-up word can thereafter be used to activate the voice recognition capability of the system.

Voice recognition is highly desirable and may even be required for some situations, such as when driving an automobile. However, it may not be desirable to have voice recognition activated at all times. One reason for this is because voice recognition tends to consume large amounts of power.

Voice recognition may be associated with multiple states such as, for example: "Not available", "Available but not trained/configured", "Available but not enabled", "Ready", and "Activated". The Not available state indicates that voice recognition is not available for use on the wireless device. The Available but not trained/configured state indicates that the user needs to train the voice recognition with the wake-up words, or the user has disabled voice recognition. The Available but not enabled state indicates that the hands-free kit has not been connected to the wireless device. The Ready state indicates that voice recognition is ready to receive the voice activation commands (e.g., wakeup, wake-up). At this time, the annunciator may be displayed. The Activated state indicates that voice recognition is turned on and can accept voice commands (e.g., call, dial, answer, and so on). At this time, a different annunciator design may be displayed (e.g., a flashing annunciator). Voice recognition may also be associated with fewer, additional, and/or different states. For example, voice recognition may be associated with just two states: Unavailable and Activated.

In an embodiment, a Voice Recognition annunciator is shown on the display whenever voice recognition is enabled or activated for the wireless device. The Enabled and Activated states may be indicated by two different designs for the Voice Recognition annunciator, as described below.

The Enabled annunciator design may be shown starting from the time the wireless device is coupled to the hands-free kit, which is normally the time that the system is ready to accept the wake-up word. This annunciator design would be displayed until voice recognition is either activated or disabled. In the Enabled state, the voice recognition system can accept the wake-up word or some other defined user action to activate voice recognition. The voice recognition system may also be disabled, for example, by (1) the user pressing a key designated to disable voice recognition, (2) the user giving a designated voice command (e.g., "Turn VR Off"), (3) the disconnection of the hands-free kit from the wireless device, or (4) some other action.

The Activated annunciator design may be shown starting from the time voice recognition is activated on the wireless device until the time it is deactivated or disabled. In the Activated state, the voice recognition system is able to accept voice commands. The system may be disabled as described above and may also be deactivated, for example, by (1) the user pressing a key designated to deactivate voice recognition, (2) the user giving a designated voice command (e.g., "Deactivate VR"), or (3) some other action.

Voice Memo

Voice memo is a voice application whereby the user can record memos or messages on the wireless device by speaking into the device. Voice memo may be used to store notes for later retrieval, and may advantageously be used in a mobile environment when the user is not able to write notes. Conventionally, the user does not know whether there are any voice memos recorded on the wireless device because no messages or icons are provided to notify the user of such condition. The user would then need to manually go through one or more menus to check for recorded voice memos, which may be a cumbersome process.

In an embodiment, a Voice Memo annunciator is shown on the display whenever one or more new voice memos have been recorded on the wireless device. This annunciator may be displayed starting from the time the first voice memo was recorded until the time the annunciator is cleared. The Voice Memo annunciator may be cleared by various user actions such as, for example, (1) the user pressing a specific key or menu option defined to clear the annunciator. (2) the user having listened to all recorded voice memos and clearing the annunciator, (3) the user deleting the new voice memo(s), or (4) some other means.

Figure 3B:
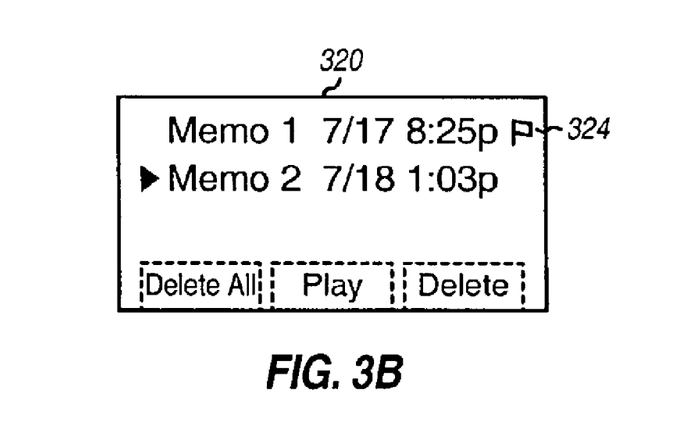

FIG. 3B illustrates an example menu screen 320 for a list of voice memos recorded on the wireless device. This menu screen may be shown in response to the user pressing a particular key or menu option defined to invoke this screen. The recorded voice memos may be shown, e.g., one memo per line. Each line would contain some pertinent information for the recorded voice memo such as the date and time when the voice memo was recorded. The user may be able to scroll through the list of recorded voice memos and select a particular voice memo.

The user may play the selected voice memo (e.g., by pressing a "Play" soft-key menu option) or delete this voice memo (e.g., by pressing a "Delete" menu option). A flag 324 may be used to indicate whether or not the voice memo has been listened to by the user. Once all recorded voice memos have been played, the Voice Memo annunciator is cleared from the display.

Voice memo may be associated with multiple states such as, for example: "No Voice Memos", "Old Voice Memos", and "New Voice Memos". The No Voice Memos state may indicate that there are no voice memos recorded on the wireless device. The Old Voice Memos state may indicate that there is at least one old voice memo stored on the wireless device, but no new one. The New Voice Memos state may indicate that there is at least one new recorded voice memo that has not been listened to. The voice memo may also be associated with fewer, additional, and/or different states. For example, the voice memo may be associated with just two states: No Voice Memos and New Voice Memos.

Multiple designs may be provided for the Voice Memo annunciator to identify the multiple states of the voice memo application. One of the annunciator designs would then be displayed depending on the current state of this application.

Answering Machine

Answering machine is a voice application whereby the wireless device records voice messages for missed incoming calls and stores these voice messages on the device itself. Answering machine is different from voicemail in several ways. In particular, voice messages for voicemail are stored at the network and the user needs to make a call from the wireless device to the network to retrieve these voice messages. In contrast, the answering machine can be activated and deactivated by the user, and further stores voice messages locally on the wireless device so that they can be retrieved at anytime without having to make a call to the network.

In an embodiment, an Answering Machine annunciator is shown on the display whenever the answering machine is activated or if one or more new voice messages have been recorded by the answering machine. The answering machine may be activated by the user pressing a defined key or some other defined action, and may be deactivated by another defined key or action. Once activated, the answering machine records and stores voice messages for incoming calls that the user misses or chooses to ignore.

Figure 3C:
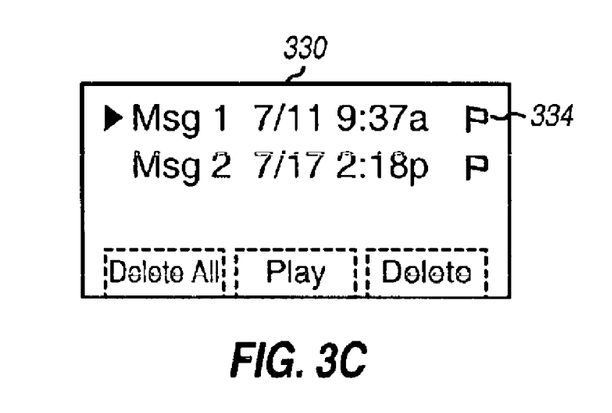

FIG. 3C illustrates an example menu screen 330 for a list of voice messages recorded by the answering machine. This menu screen may be shown whenever requested (e.g., by the user pressing a particular key or menu option). The recorded voice messages may be shown, e.g., one message per line. Each line would contain some pertinent information for the recorded voice message (e.g., the date and time the message was recorded). The user may be able to scroll through the list of recorded voice messages and select a particular message. The user may also play or delete the selected message by selecting the proper menu options. A flag 334 may be used to indicate whether or not the voice message has been listened to by the user.

The answering machine may be associated with two annunciators, each of which may be further be associated with multiple states. The first annunciator may be associated with, for example, "Deactivated" and "Activated" states. The Deactivated state indicates that the answering machine has not been activated, and the Activated state indicates that the answering machine has been activated and can record voice messages for incoming calls. The second annunciator may be associated with, for example, "No Message", "Old Messages", and "New Messages". The No Messages state indicates that there are no voice messages recorded on the answering machine. The Old Messages state indicates that there is at least one old recorded voice message on the answering machine, but no new one The New Messages state indicates that there is at least one new recorded voice message that has not been listened to. The answering machine may also be associated with fewer, additional, and/or different annunciators and states. For example, the answering machine may be associated with just one annunciator with two states: No Messages and New Messages.

Multiple designs may be provided for the Answering Machine annunciators to identify the multiple states of the answering machine. The appropriate annunciator design(s) would then be displayed depending on the current state of the answering machine.

Data Call

As used herein, a data call refers to all other types of call except for voice call. A data call may be associated with various attributes that may not be applicable for a voice call and which may be pertinent to the user.

In an embodiment, a Data Call annunciator is shown on the display whenever there is at least one data call in progress. The user may view detailed information for the pending data calls via associated menu screens. For example, the user may first request a listing of all pending data calls to be shown in a summary display. The user may then select a particular data call (e.g., using the "Scroll Up" and "Scroll Down" keys) and may request to view detailed information for the selected data call, which would then be shown in a detailed display. The detailed information would include various attributes for the data call. Table 3 lists some attributes that may be shown in the detailed display for a data call.

TABLE 3

| Information Type | Description or Values |
| --- | --- |
| Data rate | transmit and/or receive data rates |
| Connection status | active "[A]" or dormant "[D]" |
| Activity | transmitting "[Tx]"or receiving "[Rx]" |
| Service type | packet switched, circuit switched, and so on |
| Maximum data rate | |
| Mode | CDMA 1x-EVDO, CDMA, GSM, GPRS, W-CDMA, and so on |
| Billing unit | by packets, time, or some other unit |
| IP address | |

Announcement and Design of Annunciators

In an embodiment, the annunciators to be displayed by the wireless device are announced when the device is powered on to inform the user of the status of various applications. Additional information may also be provided with the announcement. As an example, the following announcement may be made at power on: "2 Missed Calls, 1 new Voice Memo, Voice Recognition enabled".

An announcement may also be made whenever an annunciator is to be displayed. As an example, an announcement may be made when voice recognition is enabled, when the answering machine is activated, when the first missed call was received, and so on.

The annunciators shown in Table 2 are specific designs that may be used for various voice and data applications. Other designs may also be used for these applications, and this is within the scope of the invention.

Each voice and data application may be associated with a number of states, as described above. Table 4 lists the voice and data applications and their states, for a specific embodiment.

TABLE 4

| Application | States |
| --- | --- |
| Voice Call Handling | No Missed Calls, Missed Calls |
| Voice Recognition | Unavailable, Enabled, and Activated |
| Voice Memo | No Voice Memos, Old Voice Memos, and New Voice Memos |
| Answering Machine | Deactivated, Activated, Old Messages, and New Messages |
| Data Call | No Data Calls, Data Calls |

For each application with three or more states, it is desirable for the annunciator to indicate the specific current state of the application. For each such application, multiple designs may be provided for the annunciator to identify these multiple states. One of the annunciator designs would then be displayed depending on the current state of the application.

The multiple designs for a given annunciator may be achieved in various manners. For example, different annunciator designs may be provided using a combination of (1) regular highlighting (e.g., a dark icon against a clear background), (2) reverse highlighting (e.g., a light icon against a dark background), (3) a blinking icon, (4) different colors for the icon, (5) crossed-out icon, and so on. As a specific example, two different designs may be provided for the Voice Recognition annunciator—a first design with regular highlighting to indicate that voice recognition is enabled, and a second design with reverse highlighting to indicate that voice recognition is activated. No Voice Recognition annunciator would be displayed if voice recognition is not available.

The missed calls may be assigned different priorities. In this case, it may be desirable for the Missed Call annunciator to indicate the priority of the missed call (if there is only one), the highest priority of all missed calls, or some other priority for the missed calls. The different priorities may be indicated by different designs such as, for example, different levels of highlighting from regular to reverse highlighting. A high priority missed call may also be indicated by a blinking icon or some other design.

Figure 2:
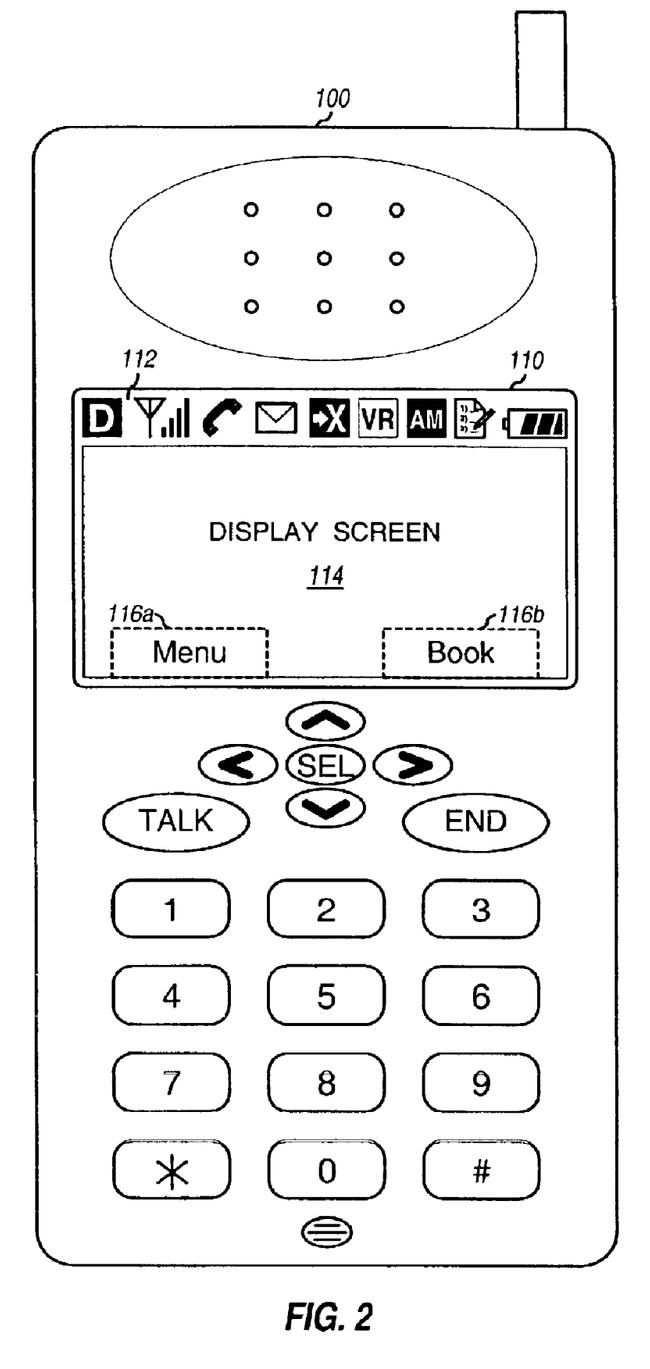

FIG. 2 shows the wireless device with the annunciators for various voice applications shown on the top row of the display. In this example, the Missed Call and Answering Machine annunciators are shown with reverse highlighting to indicate that there is at least one missed call and at least one new message on the answering machine. The Voice Memo annunciator is shown with normal highlighting to indicate that there is at least one new voice memo. The Voice Recognition annunciator is shown with regular highlighting to indicate that voice recognition is enabled but not activated.

Figure 4:
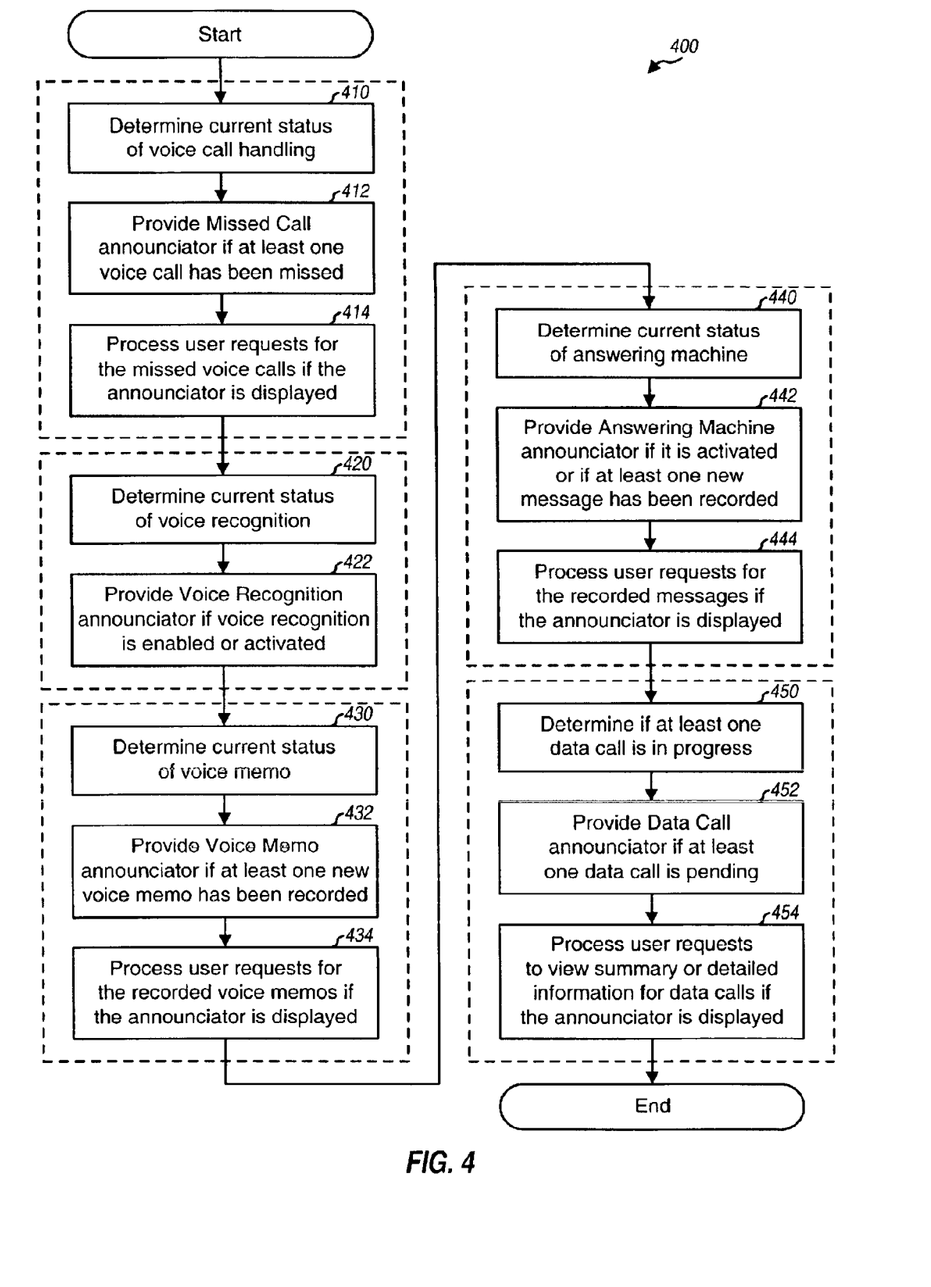
FIG. 4 is a flow diagram of a process for displaying annunciators and performing processing for voice and data applications.

FIG. 4 is a flow diagram of an embodiment of a process 400 for displaying annunciators and performing processing for voice and data applications.

The current status of voice call handling is determined (step 410), and the Missed Call annunciator is provided for display if at least one voice call has been missed (step 412). If this annunciator is displayed, then user requests for the missed voice calls are processed (step 414). The missed call processing may include showing the listing of missed calls whenever requested, clearing the flag for a selected missed call, returning the selected missed call, and so on.

The current status of voice recognition is determined (step 420), and the Voice Recognition annunciator is provided if voice recognition is enabled or activated (step 422). As noted above, different annunciator designs may be used to indicate the enabled and activated states of voice recognition.

The current status of voice memo is determined (step 430), and the Voice Memo annunciator is provided if at least one new voice memo has been recorded (step 432). If this annunciator is displayed, then user requests for voice memos are processed (step 434). The voice memo processing may include showing the listing of recorded voice memos whenever requested, playing or deleting a selected voice memo, and so on.

The current status of the answering machine is determined (step 440), and the Answering Machine annunciator is provided if it is activated or if at least one new message has been recorded by the answering machine (step 442). If at least one message has been recorded, then user requests for the recorded messages are processed (step 444). The message processing may include showing the listing of recorded messages whenever requested, playing or deleting a selected message, and so on.

A determination is made whether or not there is at least one data call in progress (step 450), and the Data Call annunciator is provided if the answer is yes (step 452). If this annunciator is displayed, then user requests to view a summary of the data calls or detailed information for a selected data call are processed (step 454).

The process shown in FIG. 4 is a specific embodiment. Other processes may also be implemented to display the annunciators and their associated menu screens, and this is within the scope of the invention.

Figure 5:
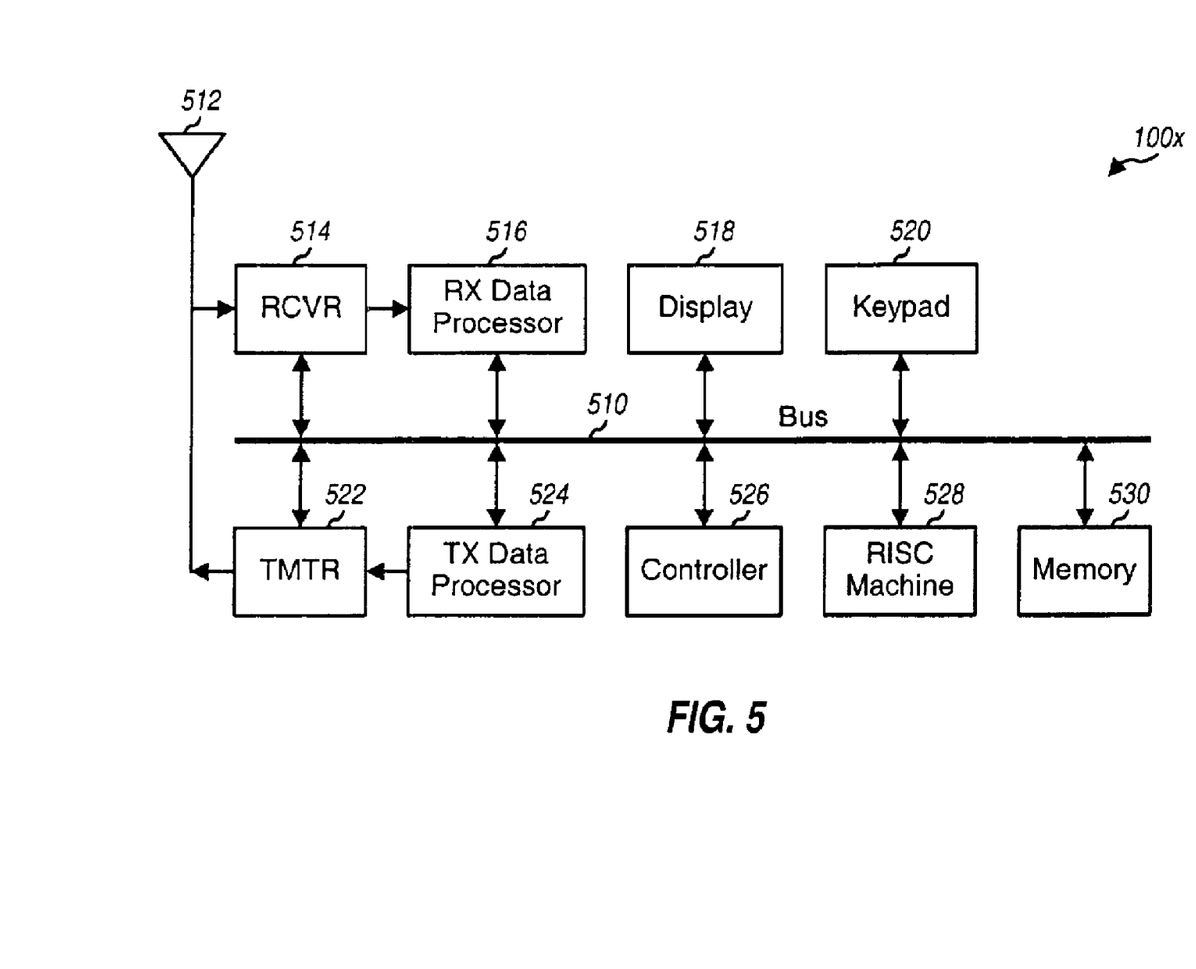
FIG. 5 is a block diagram of the wireless communication device.

FIG. 5 is a block diagram of a wireless communication device 100x, which is an embodiment of device 100 shown in FIG. 1. On the receive path, a modulated signal transmitted from a base station is received by an antenna 512 and provided to a receiver unit (RCVR) 514. Receiver unit 514 conditions (e.g., filters, amplifies, and downconverts) the received signal and further digitizes the conditioned signal to provide samples. A receive (RX) data processor 516 then demodulates and decodes the samples to provide decoded data. On the transmit path, data to be sent by the wireless device is provided to a transmit (TX) data processor 524, which encodes and modulates the data. The modulated data is then conditioned by a transmitter unit (TMTR) 522 to provide a modulated signal suitable for transmission back to the base station.

A display 518 is used to show various types of information to the user, including the annunciators and menu screens described above. Display 518 may be a liquid crystal display (LCD), an active matrix display, or some other type of display. A keypad 520 is used to accept user requests and inputs and may include fewer, additional, and/or different keys than those shown in FIG. 1.

A controller 526 directs the operation of the units within wireless device 100x. For example, controller 526 may direct the processing of messages/signaling exchanged with the network to receive an incoming call or to originate an outgoing call. A RISC (reduced instruction set computing)

machine 528 may be used to execute codes for various functions. For example, RISC machine 528 may execute codes to maintain the states of voice and data applications and provide the appropriate annunciators and menu screens. The codes may implement the process shown in FIG. 4. A memory unit 530 provides storage for program codes and data used by controller 526 and RISC machine 528, and data for other units within device 100x.

FIG. 5 shows a specific embodiment of wireless device 100x. Other embodiments may also be contemplated and are within the scope of the invention.

The techniques described herein for displaying annunciators and associated menu screens may be implemented in various types of wireless communication device. For example, these techniques may be implemented in cellular phones, wireless terminals, remote stations, personal digital assistants (PDAs), palm sized personal computers, and so on. Moreover, these techniques may be used for various wireless communication systems including CDMA systems (e.g., IS-95, IS-2000, W-CDMA, and so on) and TDMA systems (e.g., GSM and so on).

The techniques described herein for displaying annunciators and associated menu screens may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 530 in FIG. 5) and executed by a processor (e.g., controller 526 or RISC machine 528). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of displaying annunciators for applications in a wireless communication device, comprising:
   determining an application and its current status supported by the wireless communication device, wherein the application includes call handling, data call handling, voice recognition, voice memo, or answering machine;
   providing an annunciator, if required, indicative of the current status of the application;
   maintaining a listing of each instance the application is accessed by the wireless communication device; and
   continually displaying the annunciator until each listing is cleared by a user.

2. The method of claim 1, wherein the application is voice call handling, and wherein the annunciator is provided if at least one voice call has been missed.

3. The method of claim 2, wherein the annunciator indicates a particular priority of the at least one missed voice call.

4. The method of claim 2, further comprising:
   receiving an indication to view the at least one missed voice call; and
   providing a listing with the at least one missed voice call.

5. The method of claim 2, further comprising:
   receiving an indication to clear the annunciator for the at least one missed voice call; and
   removing the annunciator.

6. The method of claim 5, wherein the indication to clear the annunciator is received if each of the at least one missed voice call has been viewed.

7. The method of claim 1, wherein the application is voice recognition, and wherein the annunciator indicates a current state of voice recognition on the wireless communication device.

8. The method of claim 7, wherein the annunciator indicates whether or not voice recognition is enabled for the wireless communication device.

9. The method of claim 7, wherein the annunciator indicates whether or not voice recognition is activated for the wireless communication device.

10. The method of claim 1, wherein the application is voice memo, and wherein the annunciator is provided if at least one new voice memo has been recorded on the wireless communication device.

11. The method of claim 10, further comprising:
    receiving an indication to view the at least one voice memo; and
    providing a listing with the at least one voice memo.

12. The method of claim 1, wherein the application is answering machine, and wherein the annunciator indicates a current state of the answering machine.

13. The method of claim 12, wherein the annunciator indicates whether or not the answering machine is activated.

14. The method of claim 12, wherein the annunciator indicates whether or not at least one new message has been recorded by the answering machine.

15. The method of claim 14, further comprising:
    receiving an indication to view the at least one new message; and
    providing a listing with the at least one new message.

16. The method of claim 1, wherein the application is data, and wherein the annunciator indicates whether or not at least one data call is in progress.

17. The method of claim 1, wherein the wireless communication system is a cellular phone.

18. A computer program product for displaying annunciators for applications in a wireless communication device, comprising:
    code for determining an application and its current status supported by the wireless communication device, wherein the application includes voice call handling, data call handling, voice recognition, voice memo, or answering machine;

code for providing an annunciator, if required, indicative of the current status of the application;

code for maintaining a listing of each instance the application is accessed by the wireless communication device;

code for continually displaying the annunciator until each listing is cleared by a user; and a computer-usable medium for storing the codes.

19. The computer program product of claim 18, further comprising:

code for receiving an indication to view items for the application; and code for providing a listing with the items for the application.

20. A memory communicatively coupled to a digital signal processing device (DSPD) capable of interpreting digital information to:

determine an application and its current status supported by the wireless communication device, wherein the application includes voice call handling, data call handling, voice recognition, voice memo, or answering machine;

provide an annunciator, if required, indicative of the current status of the application;

maintaining a listing of each instance the application is accessed by the wireless communication device; and continually displaying the annunciator until each listing is cleared by a user.

21. An integrated circuit operative to provide annunciators for applications in a wireless communication device, comprising:

means for determining an application and its current status supported by the wireless communication device, wherein the application includes voice call handling, data call handling, voice recognition, voice memo, or answering machine;

means for providing an annunciator, if required, indicative of the current status of the application;

means for maintaining a listing of each instance the application is accessed by the wireless communication device; and means for continually displaying the annunciator until each listing is cleared by a user.

22. A wireless communication device comprising:

means for determining an application and its current status supported by the wireless communication device, wherein the application includes voice call handling, data call handling, voice recognition, voice memo, or answering machine;

means for providing an annunciator, if required, indicative of the current status of the application;

means for maintaining a listing of each instance the application is accessed by the wireless communication device; and means for continually displaying the annunciator until each listing is cleared by a user.

23. The device of claim 22 and operative in a CDMA, W-CDMA, GSM, or GPRS system.

* * * * *